United States Patent Office 3,595,934
Patented July 27, 1971

3,595,934
RADIATION RESISTANT VINYL-CONTAINING SILOXANE COMPOSITIONS
Anthony J. Butler, Keith E. Polmanteer, and Forrest O. Stark, Midland, Mich., assignors to Dow Corning Corporation, Midland, Mich.
No Drawing. Filed Nov. 6, 1967, Ser. No. 681,015
Int. Cl. C08g 47/00
U.S. Cl. 260—825
2 Claims

ABSTRACT OF THE DISCLOSURE

A tacky copolymer of vinylmethylphenylsiloxy-endblocked phenylmethylsiloxane fluids and tris(dimethylhydrogensiloxy)phenylsilane as crosslinker with a significant excess of SiH is found to yield a very stable interlayer for radiation cave windows.

---

This invention relates to a radiation resistant polysiloxane composition suitable for use as an interlayer material for radiation chamber windows and to the article of manufacture employed therewith.

In radiation caves exposure to high energy radiation often produces drastic changes in the physical and chemical properties of materials. Also, within radiation chambers serious problems of electron buildup frequently occur. This latter phenomenon is especially noticeable in glass windows having an interlayer which is neither void free nor radiation resistant. Simply, when voids are present between glass plates they become the locus of electron accumulations rendering the window hazardous.

There are several reasons for the formations of these voids. They can be formed from entrapped air, from gases released upon exposure by chemical activity of radiation-sensitive interlayer material or from over crosslinking of the interlayer materials induced by radiation. It is theorized that the gaseous composition making up the void is subjected to ionization from the radioactive sources which give rise to the problem of electron discharge or avalanche within the glass radiation window.

Although mineral oil has been customarily used in radiation windows as an interlayer it has a disadvantage of clouding upon prolonged exposure. Furthermore, it is known that certain organic groups are more radiation-resistant than others. Thus, stabilization of silicone polymers against radiation can be realized when phenyl side groups are present, whereas radiolysis of unsaturated molecules produce an enhancement of addition and condensation reactions.

It is the object of this invention to provide a novel organosiloxane composition which will preclude conditions allowing electron discharge. It is a further object of this invention to provide a radiation resistant interlayer material, i.e., one which does not become friable and brittle upon long exposure.

It is also the object of this invention to provide an optically clear void free continuous phase of interlayer material or encapsulant. Other objects and advantages will be apparent from the following description.

The above objects are attained by the organosiloxane composition of the present invention.

This invention relates to a composition of matter suitable for use in glass windows for radiation caves consisting essentially of a mixture of fluid (1) vinylmethylphenylsiloxy-endblocked phenylmethylsiloxane having a viscosity of 300 to 100,000 cs. at 25° C. and (2) $\phi\text{Si}(\text{OSiRMeH})_m$ or $(\text{HMe}\phi\text{SiO})_n\text{SiO}_{\frac{4-n}{2}}$
    $\underset{\frac{3-m}{2}}{\overset{|}{\text{O}}}$ where R is either phenyl or methyl in which $m$ and $n$ are of a value such that the copolymer (2) contains on the average at least three SiH groups per molecule and is compatible with (1), the mol ratio of (1) to (2) being such that there is an excess of SiH over SiVi in the mixture of from 70 to 100 mol percent.

Herein, the term Vi is vinyl, $\phi$ is phenyl and Me is methyl.

The siloxane mixtures of this invention are cured by mixing with a platinum catalyst. The cure will take place at room temperature, but elevated temperatures can be used, if desired. The amount of platinum catalyst employed may range from 3 to 7 parts per million, preferably at 5 parts per million.

The composition of this invention can be cast-in-place, that is, the curing of the siloxanes can be accomplished at room-temperature within the radiation window.

Polysiloxane (1) must have less than one mol percent vinylsiloxane. The term vinylsiloxane as used herein, includes any siloxane unit having one vinyl group attached to a terminal silicon. The vinyl-endblocking of the organopolysiloxane (1) can be accomplished after the method of Caprino and Prochaska in their U.S. Pat. 3,096,303. In order to render maximum radiation resistance, there must be a relative balance between the phenyl to silicon groups of the phenylmethylsiloxane polymer so that it contains an average of 1:1 phenyl radicals per silicon atom.

Siloxanes (2) of this invention, $(\text{HMe}\phi\text{SiO})_n\text{SiO}_{\frac{4-n}{2}}$ or $\phi\text{Si}(\text{OSiMeRH})_m\underset{\frac{3-m}{2}}{\overset{|}{\text{O}}}$ where R is either phenyl or methyl, act as crosslinking agents when activated by a catalyst.

Each molecule of the crosslinker must have 3 or more SiH groups or else it will not function as a curing agent and also supply the excess of SiH to SiVi. The molecular structure of crosslinker (2) may be linear, branched or cyclic as:

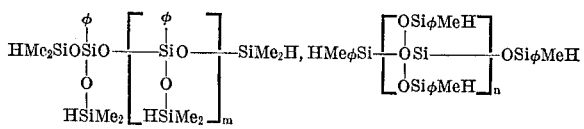

and

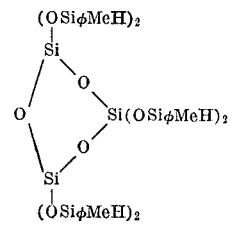

in which $m$ is 0 or an integer such as 1, 2, 3, 10, etc., and $n$ is 1 or a higher integer such as 2, 5, 7 and 15, etc.

It is important that fluid (1) and crosslinker (2) be compatible. By being "compatible" it is understood that the crosslinker is soluble and dispersible in fluid (1) and that after stirring (1) and (2) a uniform mixture is attained. Further, crosslinker (2) employed should have an aryl radical in order to be completely compatible with the polysiloxane (1).

The interlayer material of this invention is formed when the defined proportions of (1) and (2) are mixed with a catalyst such as platinum and allowed to react at room temperature. Many types of platinum catalysts are known. Preferred forms of catalysts are platinic chloride, platinum sulfate, salts of chloroplatinic acid, chloroplatinic acid and olefin complexes of platinum.

The novel composition of this invention is very stable to dosages which total $10^8$ rads at a dose rate of $8 \times 10^5$ rads per hour from a 25,000 curie source. One rad corresponds to an energy absorption of 100 ergs/g. in the particular medium being studied. Surprisingly, it was discovered that a very effective interlayer is produced when there is an excess of 70 to 100 mol percent SiH to vinyl groups present. It is important that the SiH groups be used in excess over the SiVi and that the SiH content fall within the range of the above critical limits. Furthermore, the interlayer should be cured before it is subjected to radiation.

It is believed that the curing of the siloxanes of this invention is due to the addition of the SiH group to the vinyl group in accordance with the equation $$\equiv SiH + CH_2 = CHSi \equiv \rightarrow \equiv SiCH_2CH_2Si \equiv$$

When the copolymers of this invention are to be employed in radiation windows it is desirable that they be essentially free of SiOH groups. The presence of these groups giving bubbling caused by the interaction of SiH with the SiOH.

The following examples are illustrative only and should not be construed as limiting the invention which is properly delineated in the appended claims.

EXAMPLE 1

25 g. vinylmethylphenylsiloxy - endblocked phenylmethylsiloxane having a viscosity of 14,200 cps. is mixed with .6 g. of $\phi Si(OSiMe_2H)_3$ (ca. 80% molar excess of SiH to vinyl) in the presence of 7 parts per million platinum. After being de-aired, the mixture is poured through an aperture into a window housing a one-half inch thick lead glass of 33/10 density. The sample is cured at room-temperature for three days and then subjected to $10^8$ rads over 64 hour period. The interlayer remained tacky and non-friable after radiation exposure. Furthermore, no cracking of the interlayer was noted in the prepared window showing that it withstood electrical discharge. This property of the siloxane interlayer was tested by impinging a grounded metal spike against the glass face piece causing discharge within the glass that did not propagate through the siloxane interlayer.

EXAMPLE 2

An effective interlayer material was formed by taking 60 g. vinylmethylphenylsiloxy-endblocked phenylmethylsiloxane having a viscosity of 14,700 cps. and containing 5 p.p.m. platinum and mixing therein 1.8 g.

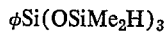

(ca. 100% molar excess of SiH/SiVi). A tacky composition was formed after 24 hours at room-temperature.

EXAMPLE 3

Ineffective interlayer materials were formed with vinylmethylphenylsiloxy-endblocked phenylmethylsiloxane and $\phi(OSiMe_2H)_3$ containing Pt when 25% and 120% molar excess of SiH over SiCH=CH$_2$ were used.

EXAMPLE 4

Results equivalent to those of Example 1 are obtained when $(HMe\phi SiO)_4Si$ is used instead of $\phi Si(OSiMe_2H)_3$ in the presence of a platinum catalyst.

EXAMPLE 5

Results equivalent to those of Example 1 are obtained when

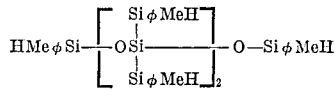

is used instead of $\phi Si(OSiMe_2H)_3$ in the presence of a platinum catalyst.

That which is claimed is:

1. A composition of matter suitable for use in glass windows for radiation caves consisting essentially of a mixture of fluid
   (1) vinylmethylphenylsiloxy-endblocked phenylmethylsiloxane having a viscosity of from 300 to 100,000 cs. at 25° C. and containing less than one mol percent vinylsiloxane, and
   (2)

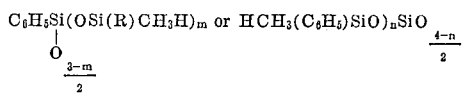

where R is phenyl or methyl and $m$ and $n$ are of a value such that the copolymer (2) contains on the average of at least 3 SiH groups per molecule, and is compatible with (1), the mol ratio of (1) to (2) being such that there is an excess of SiH over SiVi in the mixture of from 70 to 100 mol percent, and
   (3) a platinum catalyst.

2. The cured composition of claim 1.

References Cited

UNITED STATES PATENTS

| | | | |
|---|---|---|---|
| 2,877,255 | 3/1959 | Clark | 260—448.2 |
| 2,915,497 | 12/1959 | Clark | 260—46.5 |
| 3,096,303 | 7/1963 | Caprino et al. | 260—46.5 |
| 3,249,581 | 5/1966 | Nelson | 260—37 |
| 3,284,406 | 11/1966 | Nelson | 260—46.5 |
| 3,304,259 | 2/1967 | Wright | 252—49.6 |
| 3,461,185 | 8/1969 | Brown | 260—825 |

DONALD E. CZAJA, Primary Examiner

M. T. MARQUIS, Assistant Examiner

U.S. Cl. X.R.

161—193; 260—46.5, 448.2